United States Patent [19]

Kanno et al.

[11] Patent Number: 5,307,426
[45] Date of Patent: Apr. 26, 1994

[54] IMAGE PROCESSING APPARATUS WITH IMPROVED DITHERING SCHEME

[75] Inventors: Hiroki Kanno, Yokohama; Hitoshi Yoneda, Kawasaki, both of Japan

[73] Assignee: Kabushiki Kaisha Toshiba, Kawasaki, Japan

[21] Appl. No.: 64,791

[22] Filed: May 24, 1993

Related U.S. Application Data

[63] Continuation of Ser. No. 756,630, Sep. 9, 1991, abandoned.

[30] Foreign Application Priority Data

Sep. 11, 1990 [JP] Japan .................. 2-238901

[51] Int. Cl.$^5$ .............................................. G06K 9/38
[52] U.S. Cl. ........................ 382/50; 382/54; 358/461; 358/466; 358/456
[58] Field of Search .......................... 382/50, 53, 54; 358/461–466, 456; G06K 9/38, 9/40; H04N 1/40

[56] References Cited

U.S. PATENT DOCUMENTS

| | | | |
|---|---|---|---|
| 4,958,238 | 9/1990 | Katayama et al. | 358/456 |
| 4,975,786 | 12/1990 | Katayama et al. | 382/50 |
| 5,060,284 | 10/1991 | Klees | 382/50 |
| 5,068,746 | 11/1991 | Ohsawa et al. | 382/54 |
| 5,077,812 | 12/1991 | Kanno et al. | 382/50 |

*Primary Examiner*—Yon J. Couso
*Attorney, Agent, or Firm*—Foley & Lardner

[57] ABSTRACT

This invention utilizes the fact that a maximum density difference of pixels in a window within a predetermined range including a pixel of interest is large for a character region, and is small for a photograph region. A maximum density difference of an image within the predetermined region is calculated. A quantization error of pixels around the pixel of interest is calculated, and a correction amount is then calculated by proportionally distributing the quantization error in accordance with a feature amount calculated by a feature amount calculator. The correction amount is added to an image signal of the pixel of interest to form a compensation image signal, and the compensation image signal is quantized.

11 Claims, 4 Drawing Sheets

IMAGE PROCESSING APPARATUS WITH IMPROVED DITHERING SCHEME

This application is a continuation of application Ser. No. 07/756,630, filed Sep. 9, 1991 now abandoned.

BACKGROUND OF THE INVENTION

1. Field of the Invention

The present invention relates to an image processing apparatus which can perform quantization processing of a document image including both a character portion and a photograph portion while maintaining high resolution of the character portion and a high gray scale characteristic of the photograph portion.

2. Description of the Prior Art

In general, in an image processing apparatus, such as a document image processing apparatus which can process not only code data but also image data, when image data are read by a reading means such as a scanner. The image data of, e.g., characters, graphs, and the like having a contrast are subjected to simple quantization using a fixed threshold value. Image data of, e.g., photographs having a gray scale are subjected to quantization by a pseudo gray scale means such as a dithering method. The reason why such processing operations are performed is as follows. That is, when read image data are uniformly subjected to simple quantization processing using a fixed threshold value, image quality is not degraded in a character/line region since the resolution is preserved. However, image quality is degraded in a photograph region since the gray scale characteristic cannot be preserved. On the other hand, when read image data are uniformly subjected to gray scale processing by, e.g., a systematic dithering method, image quality is not degraded in a photograph region since the gray scale characteristic can be preserved. However, an image with poor image quality is formed in a character/line region since the resolution is impaired.

As a means for solving such a problem, an "error diffusion method" as a quantization method which can satisfy a gray scale characteristic of a photograph image region, and has a better resolution of a character/line region than the systematic dithering method has been proposed. In this "error diffusion method", as described in the article entitled "An Adaptive Algorithm for Spatial Gray Scale" appearing in the journal "Proceeding of the S.I.D Vol. 17 2 Second Quarter 1976 p.p. 75–77", a product of a quantization error obtained when a pixel of interest is quantized by a given threshold value, and a predetermined weighting coefficient is diffused to non-quantized pixels in a predetermined region around the pixel of interest, and when the non-quantized pixels are quantized, quantization is performed while adding the diffused quantization error as a correction value.

In the "error diffusion method", since quantization processing is performed for a document image including both a character region and a photograph region by the same method, processing according to features of the respective regions cannot be performed. For this reason, when an input image places importance on the gray scale, quantization processing which can sufficiently satisfy the gray scale characteristic can be performed. However, in an image such as a character image which places importance on the resolution rather than the gray scale characteristic, the resolution of a character portion is impaired due to error compensation processing.

SUMMARY OF THE INVENTION

It is an object of the present invention to provide an image processing apparatus which can improve image quality by executing quantization processing of image data according to the features of images, and can improve processing efficiency in various image processing operations by executing processing according to the features of images.

An image processing apparatus of the present invention comprises quantization mean for quantizing image data of a pixel of interest in an image to be processed, quantization error calculation means for calculating a quantization error on the basis of the data quantized by the quantization means and the image data, feature amount extraction means for extracting a feature amount representing a feature of an image from image data within a predetermined range including the pixel of interest, error correction amount calculation means for calculating an error correction amount for correcting the quantization error from the quantization error calculation means in accordance with the feature amount extracted by the feature amount extraction means, weighting coefficient storage means for prestoring a weighting coefficient for calculating a weighted error, weighted error calculation means for calculating a weighted error by multiplying the error correction amount from the error correction amount calculation means with the weighting coefficient stored in the weighting coefficient storage means, error storage means for storing the weighted error calculated by the weighted error calculation means, and correction means for correcting the image data of the pixel of interest in accordance with the weighted error stored in the error storage means.

The present invention utilizes a feature that a maximum density difference of pixels in a window within a predetermined range including a pixel of interest is large for a character region, and is small for a photograph region. A maximum density difference of an image within the predetermined region is calculated. A quantization error of pixels around the pixel of interest is calculated, and a correction amount is then calculated by proportionally distributing the quantization error in accordance with a feature amount calculated by the feature amount calculation means. The correction amount is added to an image signal of the pixel of interest to form a compensation image signal, and the compensation image signal is quantized. More specifically, if the value of the maximum density difference as the feature amount is large, the pixel of interest is determined as one in a character region; if it is small, the pixel of interest is determined as one in a photograph region; or if it is in the middle, the pixel of interest is determined as one in an edge portion having a slow density gradient in the photograph region. Therefore, (i) if the maximum density difference is large, the correction amount is decreased to substantially directly quantize the image signal of the pixel of interest, and (ii) if the maximum density difference is small, the correction amount is increased to be almost equal to the quantization error value. For this reason, even in a document image including both a character portion and a photograph portion, quantization processing can be executed by methods suitable for these character and photograph portions, respectively. As a result, the quantization processing can be performed for the character portion to have a high resolution, and can be performed for the photograph portion to have a high gray scale characteristic.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 5 show an embodiment of the present invention, in which:

DETAILED DESCRIPTION OF THE PREFERRED EMBODIMENTS

An embodiment of the present invention will be described below with reference to the accompanying drawings.

Figure 1:
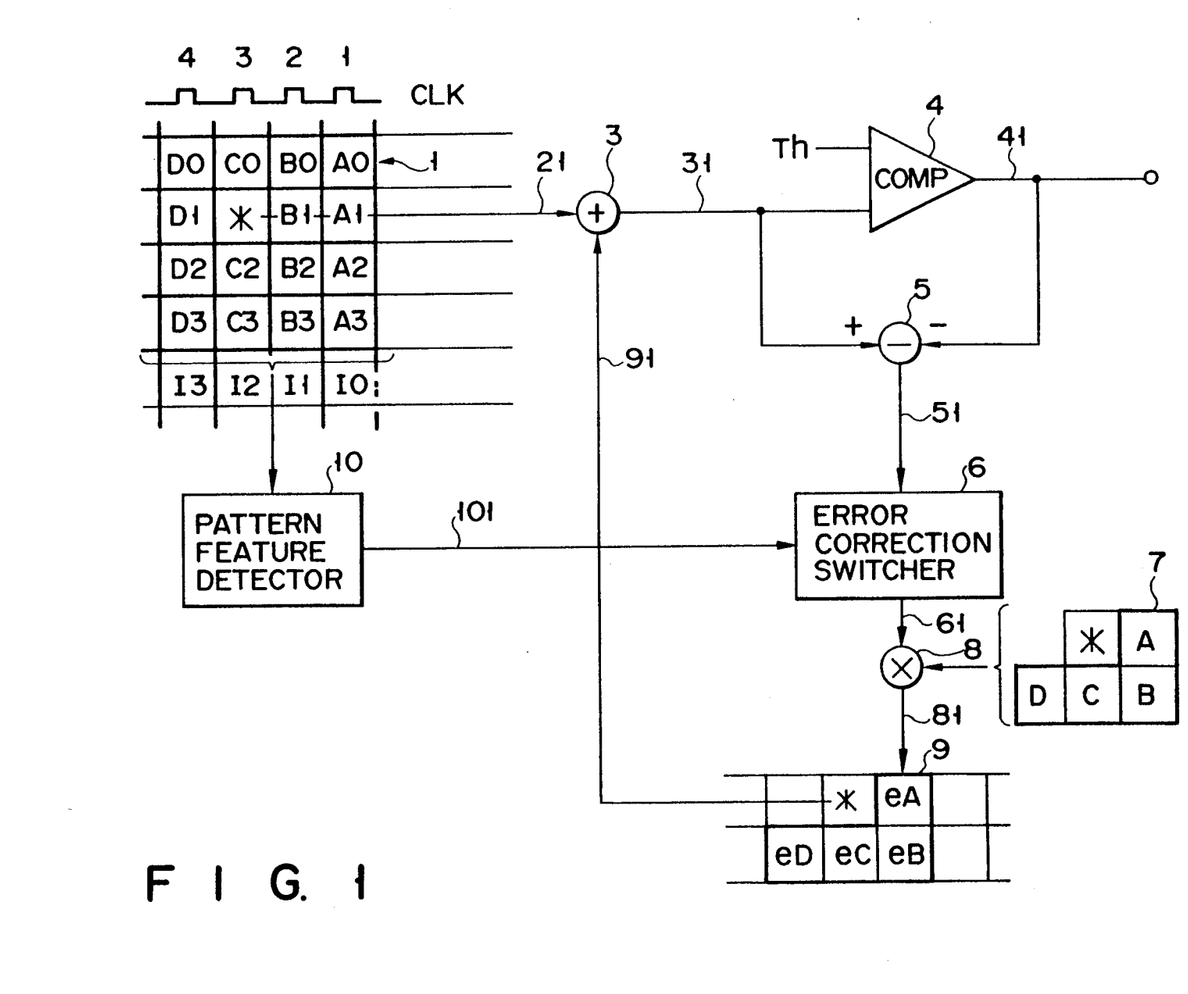
FIG. 1 is a diagram for explaining the principle of quantization processing.

FIG. 1 shows the principle of a quantization processing method according to the present invention.

In FIG. 1, line buffer 1 stores image data of an image to be processed, and "*" indicates the position of a pixel of interest in line buffer 1. Input image signal 21 read out from line buffer 1 is supplied to corrector 3.

Corrector 3 adds input image signal 21 from line buffer 1 to image correction signal 91 from error memory 9 (to be described later), thereby correcting the image data of the pixel of interest. Compensation image signal 31 corrected by corrector 3 is supplied to digitizer 4 and quantization error calculator 5.

Digitizer 4 can comprise a comparator for quantizing the corrected image data of the pixel of interest with predetermined threshold value Th. Binary image signal 41 quantized by digitizer 4 is outputed outside of the apparatus as a quantization processing result, and is also supplied to quantization error calculator 5.

Quantization error calculator 5 subtracts binary image signal 41 from compensation image signal 31 to calculate a quantization error of the pixel of interest.

Quantization error signal 51 calculated by quantization error calculator 5 is supplied to error correction switcher 6. Error correction switcher 6 corrects quantization error signal 51 in accordance with maximum density differential signal 101 from pattern feature detector 10 (to be described later). Compensation error signal 61 calculated by error correction switcher 6 is supplied to weighted error calculator 8.

Weighted error calculator 8 receives a weighting coefficient stored in weighting coefficient memory 7, and compensation error signal 61. Weighted error calculator 8 multiplies compensation error signal 61 calculated by error correction switcher 6 with the weighting coefficient from weighting coefficient memory 7, thereby calculating a weighted error. Weighted error signal 81 calculated by weighted error calculator 8 is supplied to error memory 9, and is stored as the weighted error. The weighted error stored in error memory 9 is supplied to corrector 3 as image correction signal 91.

Pattern feature detector 10 calculates a maximum density difference in a predetermined region on the basis of image data in the predetermined region (portion surrounded by a bold frame) of line buffer 1. Maximum density differential signal 101 output from pattern feature detector 10 is supplied to error correction switcher 6.

The quantization processing method of the present invention with the above arrangement will be described in detail below.

Input image signal 21 obtained by reading an image by an input device such as a scanner is corrected in accordance with image correction signal 91 in corrector 3, and is then output as compensation image signal 31.

Upon reception of compensation image signal 31, digitizer 4 compares compensation image signal 31 with quantization threshold value Th, and outputs binary image signal 41. As quantization threshold value Th, for example, hex "80" is used. If compensation image signal 31 is larger than quantization threshold value Th, digitizer 4 outputs "1" (black pixel) as binary image signal; if it is smaller than threshold value Th, digitizer 4 outputs "0" (white pixel) as binary image signal 41.

Quantization error calculator 5 calculates the difference between compensation image signal 31 and binary image signal 41 (hex "00" if binary image signal 41="0"; hex "FF" if signal 41 ="1"), and outputs it as quantization error signal 51.

Pattern feature detector 10 calculates a maximum density difference of the image densities in a 4×4 window (bold frame portion) including a pixel of interest "*", and outputs maximum density differential signal 101. Upon reception of maximum density differential signal 101, error correction switcher 6 calculates compensation error signal 61 from quantization error signal 51 on the basis of maximum density differential signal 101, and outputs it.

Weighted error calculator 8 multiplies compensation error signal 61 with weighting coefficients A, B, C, and D (A=7/16, B=1/16, C=5/16, and D=3/16) stored in weighting coefficient memory 7, thereby calculating weighted error signals 81. The "*" in weighting coefficient memory 7 in FIG. 1 indicates the position of the pixel of interest. The quantization error of the pixel of interest is multiplied with weighting coefficients A, B, C, and D to calculate weighted error signals 81 of four pixels (pixels corresponding to the positions of weighting coefficients A, B, C, and D) around the pixel of interest.

Error memory 9 stores weighted error signals 81 calculated by weighted error calculator 8. Weighted error signals 81 for four pixels calculated by weighted error calculator 8 shown in FIG. 1 are added to and stored in areas $e_A$, $e_B$, $e_C$, and $e_D$ associated with the pixel of interest "*". Image correction signal 91 is a signal at the position of "*", and is a signal obtained by accumulating weighted errors of a total of four pixels calculated in the above-mentioned procedure ($* = e_A + e_B + e_C + e_D$).

An arrangement of an image processing apparatus to which the quantization processing method of the present invention is applied will be described below with reference to FIG. 2. Note that the same reference numerals in FIG. 2 denote the same parts and signals having functions equivalent to those in FIG. 1.

Figure 2:
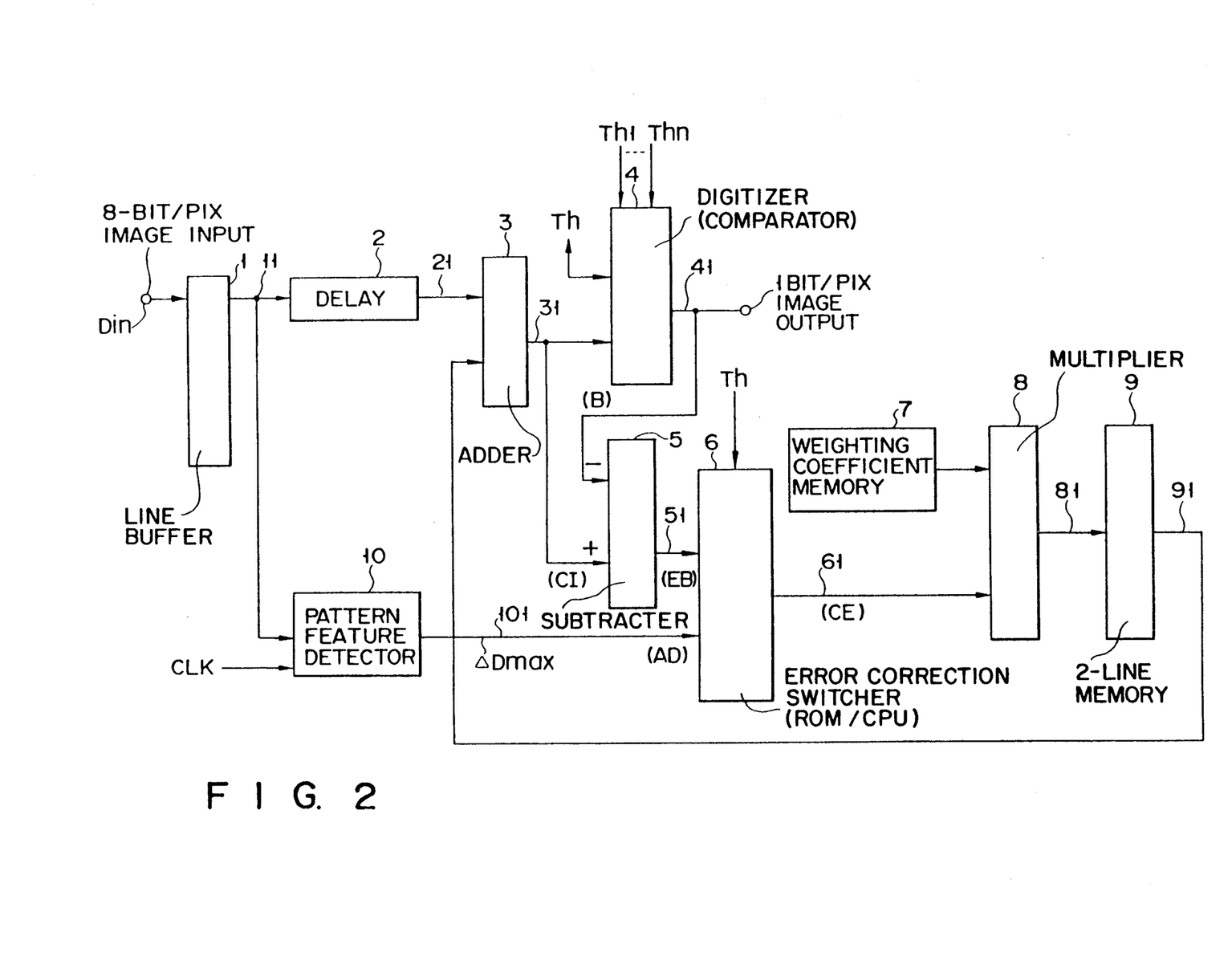
FIG. 2 is a schematic block diagram showing an arrangement of an image processing apparatus.

FIG. 2 is a schematic block diagram showing an arrangement of an image processing apparatus according to an embodiment of the present invention. In the image processing apparatus, image data Din obtained by reading an original using a reading device such as an image scanner is input as n-bit (e.g., 8-bit) digital data per pixel, and is converted to lower m-bit data (e.g., quantized to 1-bit) where both n and m are natural numbers and n > m. Line buffer 1 temporarily stores image data Din, and supplies it to the following image processing (quantization processing).

Delay 2 receives image signal 11 output from line buffer 1 in synchronism with a predetermined clock, and delays image signal 11 by a predetermined period of time, i.e., a time until image correction signal 91 is output. Delay 2 can cancel a timing offset between signals 21 and 91 for each pixel data output from line buffer 1.

Corrector 3 comprises an adder, and corrects image data of a pixel of interest. More specifically, adder 3 adds image signal 21 delayed by delay 2, and image correction signal 91 from error memory 9, and outputs compensation image signal 31. Compensation image signal 31 is compared with predetermined threshold value Th by digitizer 4 so as to be quantized, and is then output as binary image signal 41. In this case, when compensation image signal 31 is larger than quantization threshold value Th, "1" (black pixel) is output as binary image signal 41; otherwise, "0" (white pixel) is output as binary image signal 41.

Then, quantization error (EB) 51 in quantization processing is calculated. Quantization error calculator 5 comprises a subtracter, and performs subtraction processing between compensation image signal (CI) 31 output from adder 3, and binary image signal (B) 41 to calculate quantization error signal 51. More specifically, subtracter 5 calculates quantization error EB as:

$$EB = CI - B \tag{1}$$

Error correction switcher 6 can comprise a ROM and/or a CPU. Switcher 6 receives quantization error signal 51 and average maximum density differential signal (AD) 101, and outputs compensation error signal (CE) 61. More specifically, the ROM of error correction switcher 6 stores data:

$$CE = \begin{cases} 0 & (AD \geq Th) \\ EB & (AD < Th) \end{cases} \tag{2}$$

That is, ROM 6 stores data "0" at address A0 generated when AD > Th, and stores data "EB" at address A1 generated when AD < Th.

Compensation error signal (CE) 61 may be calculated as follows. Error correction switcher 6 performs normalization so that the value of the average maximum density differential signal (AD) falls within a range between 0 and 1. The normalized maximum density is represented by (AD)norm, and compensation error signal (CE) 61 is calculated by the following equation:

$$CE = EB \times (1 - (AD)\text{norm}) \tag{3}$$

The maximum density difference has a large value in a character portion having a high contrast, and has a small value in a photograph portion having a gray scale. More specifically, compensation error signal 61 calculated by equation (3) has a small value in a character portion, and has a large value in a photograph portion.

Weighted error calculator 8 can comprise a multiplier. Multiplier 8 receives compensation error signal 61 corresponding to quantization error 51, and weighting coefficients stored in weighting coefficient memory 7, and multiplies them to output weighted error signals 81. Weighting coefficient memory 7 comprises a memory for storing the above-mentioned four weighting coefficients (e.g., A = 7/16, B = 1/16, C = 5/16, and D = 3/16) in accordance with the positions corresponding to four pixels around the pixel of interest.

The weighted errors of four pixels are respectively given by:

$$e_A = A \times EB \tag{4}$$

$$e_B = B \times EB \tag{5}$$

$$e_C = C \times EB \tag{6}$$

$$e_D = D \times EB \tag{7}$$

In this case, eB may be calculated by:

$$e_B = EB - (e_A + e_C + e_D) \tag{8}$$

The respective weighted errors are stored at the corresponding positions in error memory 9. Error memory 9 comprises a 2-line memory. Image correction signal 91 is a signal read out from the position "*" of 2-line memory 9. The weighted errors for already processed four pixels are stored at the position "*" in 2-line memory 9.

When adder 3 corrects an image signal using a correction amount obtained in this manner, a character portion can be quantized to have a high resolution since the correction amount is small, and a photograph portion can be quantized to have a high gray scale characteristic since an error can be compensated by a quantization error of surrounding pixels.

Parallel to the above-mentioned operation, pattern feature detector 10 calculates a maximum density difference in a local region including the pixel of interest on the basis of image data output from line buffer 1, and outputs it as maximum density differential signal 101 as feature amount data representing a feature of an image. The maximum density difference as feature amount data is an amount representing whether image data in the local region indicates a nature unique to a character portion or a feature as a photograph portion.

Figure 3:
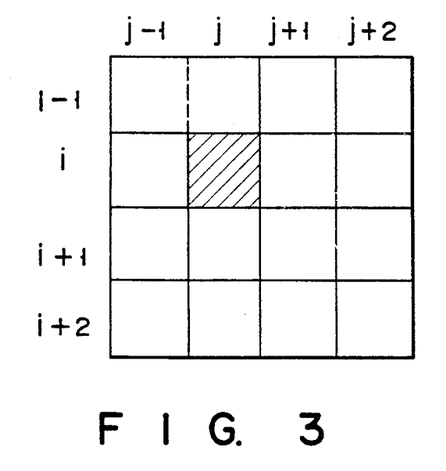
FIG. 3 is a view showing the concept of a pixel region in image processing.

More specifically, pattern feature detector 10 calculates maximum and minimum values of the image densities in a 4×4 region including the pixel of interest (indicated by hatching) on the basis of image data output from line buffer 1, as shown in FIG. 3. Detector 10 performs subtraction of these values to extract a maximum density differential signal, i.e., feature amount data in the 4×4 region. Therefore, line buffer 1 comprises a line memory having a capacity of at least four lines.

The above-mentioned feature amount data is obtained as follows.

Figure 4:
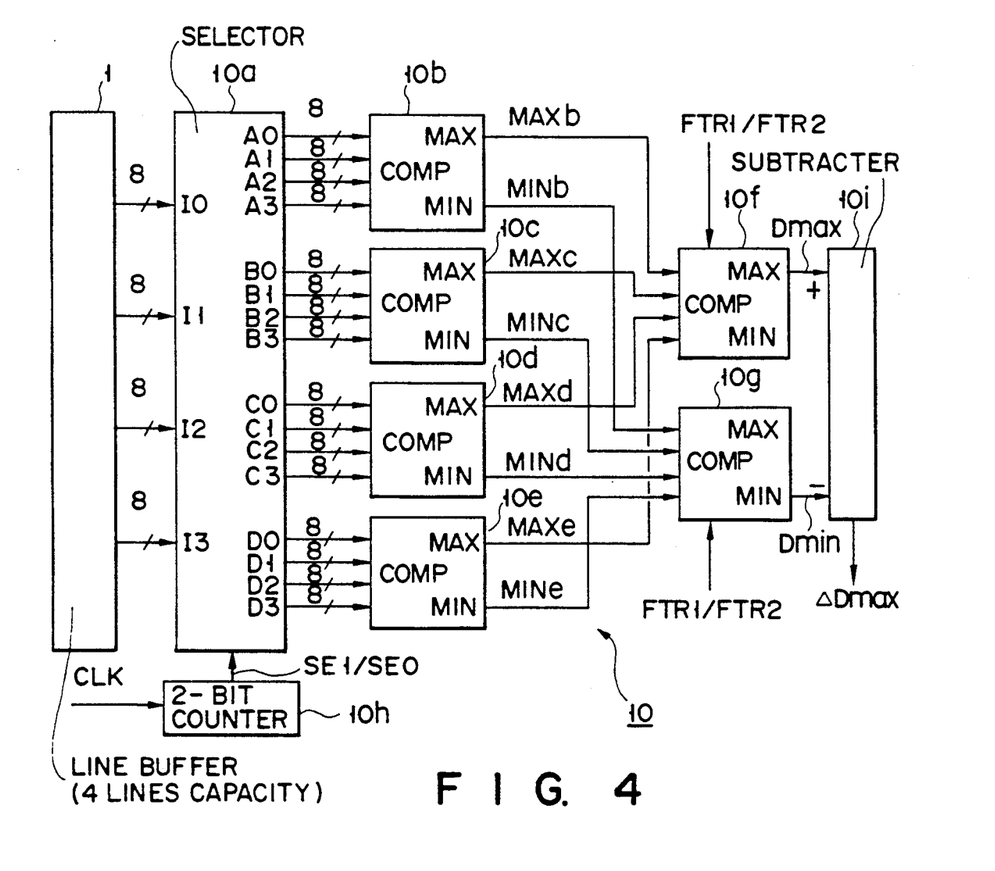
FIG. 4 is a block diagram showing a arrangement of pattern feature detector 10.

FIG. 4 is a block diagram showing an arrangement of pattern feature detector 10. Pattern feature detector 10 obtains maximum values (MAXb to MAXe) and minimum values (MINb to MINe) of the densities in a 4×4 pixel region including the pixel of interest with respect to the pixel of interest (* in buffer 1 in FIG. 1) in an image to be processed, and performs subtraction of these values to obtain a maximum density difference.

Figure 5:
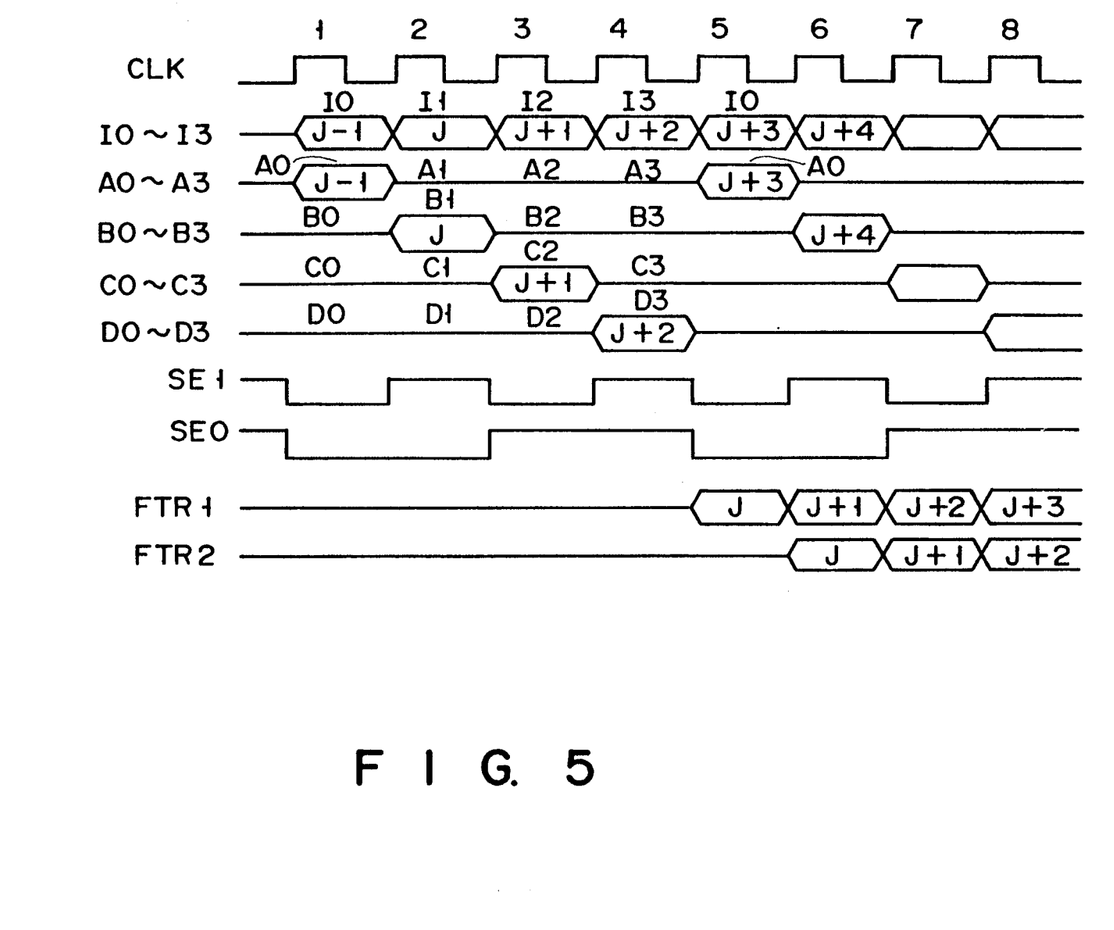
FIG. 5 is a timing chart showing an operation of pattern feature detector 10.

As shown in the timing chart of FIG. 5, pattern feature detector 10 sequentially distributes image data (8 bits/pixel) sequentially input in units of four pixels in the column direction from line buffer 1 in synchronism with clock CLK to comparators 10b, 10c, 10d, and 10e via selector 10a. Distribution of image data input in units of columns to comparators 10b, 10c, 10d, and 10e by selector 10a is controlled by selection signals SE1 and SE0 from 2-bit counter 10h which is operated in response to clock CLK.

Comparators 10b, 10c, 10d, and 10e compare image data in units of four pixels in the column direction, thus obtaining maximum densities (MAX terminal outputs), and minimum densities (MIN terminal outputs) in the corresponding columns.

Comparators 10f and 10g receive signals from comparators 10b, 10c, 10d, and 10e at a timing of FTR1, and then obtain maximum and minimum values on the basis of the maximum and minimum values obtained in the column direction.

With the above-mentioned comparison processing, maximum value Dmax and minimum value Dmin of the densities in the 4×4 pixel region shown in FIG. 3 are obtained, and are output at a timing of FTR2.

Subtracter 10i calculates maximum density difference $\Delta Dmax$ as the difference between maximum and minimum values Dmax and Dmin of the densities obtained as described above:

$$\Delta Dmax = Dmax - Dmin \qquad (9)$$

According to the image processing apparatus with the above arrangement, when a pixel of interest is to be quantized, an amount for correcting the pixel of interest with respect to a quantization error of surrounding pixels is adjusted in accordance with a feature of image data. For this reason, degradation in resolution of a character image in the conventional "error diffusion method" can be suppressed, and quantization processing which can simultaneously satisfy both the resolution of a character image and the gray scale of a photograph image can be performed. Therefore, even in a document image including both character and photograph portions, a character portion can be quantized to have a high resolution, and a photograph portion can be quantized to have a high gray scale characteristic.

According to the present invention, since an object image is not completely separated into a character region and a photograph region, no erroneously judged region is present, unlike conventional image area separation processing. Hence, degradation of image quality caused by erroneous judgment will not occur. More specifically, according to the method of the present invention, a region which tends to be erroneously judged in a conventional method such as an edge portion having a slow density gradient in a photograph region can be subjected to gray scale processing while preserving an edge portion.

Note that the present invention is not limited to the above embodiment. For example, in the above embodiment, in quantization processing, when a pixel of interest is present in a photograph region, a compensation image signal obtained by adding a quantization error of surrounding pixels and an image signal of the pixel of interest is quantized by a predetermined threshold value, and when the pixel of interest is present in a character region, the image signal itself of the pixel of interest is quantized by the predetermined threshold value. However, the present invention is not so limited. For example, a correction amount of the image signal of the pixel of interest may be calculated using a quantization error of surrounding pixels, with a maximum density difference of the surrounding pixels as a parameter. More specifically, the value of the maximum density difference of the surrounding four pixels may be normalized to fall within a range between 0 and 1, and a correction amount may be given by:

(Quantization error of surrounding pixels) × (11)
(average maximum density difference of one to four pixels)

In this manner, since the correction amount can be small in a character region, and becomes almost equal to the quantization error of the surrounding pixels in a photograph region, a compensation image signal obtained by adding this correction amount and the image signal of the pixel of interest may be quantized by a predetermined threshold value.

A reference range for extracting a feature amount is not limited to a 4×4 region, but may be desirably changed.

In the above embodiment, equations (2) and (3) are presented as examples of a calculation method of a compensation error signal. However, the compensation error signal may be calculated by:

$$CE = EB/\Delta Dmax \qquad (10)$$

Furthermore, in equations (3) and (10), "$\Delta Dmax$" may be replaced with a "maximum density difference/average density" or a feature amount having different natures in character and photograph portions such as a "Laplacian value" as a quadratic differential value of an image.

In the above embodiment, a binary output (1-bit/pixel) is obtained. However, a multi-value output (n-bit/pixel) may be performed by setting a plurality of threshold values Th (Th1 to Thn in FIG. 2) in digitizer 4, and optimal gray scale expression corresponding to a multi-value laser printer, a thermal transfer printer, or the like can be realized.

Furthermore, according to the present invention, the value of a feature amount (101), and the judgment threshold value (Th) are obtained on the basis of an image signal read by, e.g., a scanner, i.e., an amount corresponding to a reflectance of image data. However, the feature amount (101) may be obtained based on a value converted into an image density (a value obtained by logarithmically converting a reciprocal value of the reflectance; or based on a value obtained by weighting the converted value based on visual characteristics of man).

When three systems of the arrangement shown in FIG. 2 are prepared in correspondence with three primary colors (red, green, and blue; or cyan, magenta, and yellow), color processing can be realized As described above, according to the present invention, an image processing apparatus which can improve image quality by quantizing image data according to a feature of the image, and can improve processing efficiency in various image processing operations by executing processing according to the feature of the image, can be provided.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. An image processing apparatus for processing image information having a plurality of pixel data of n bits which represent a contrast of the pixel data, where n denotes a natural number of more than two, said image processing apparatus comprising:

extracting means for sequentially extracting from the image information a window containing target pixel data and peripheral pixel data of the target pixel data;

means for providing feature data having a value corresponding to a contrast with respect to pixel data of the window extracted by said extracting means;

means for converting the target pixel data into pixel data of m bits, to provide converted pixel data, where m denotes a natural number less than n;

means for detecting error data representing a difference between the target pixel data and the converted pixel data;

means for correcting the error data on the basis of the feature data to provide corrected error data, including means for comparing the feature data with a predetermined reference value so as to output a comparison result representing the error data when the value of the feature data is smaller than the reference value, and to output another comparison result having a predetermined value when the value of the feature data is larger than said reference value, and;

means for diffusing the corrected error data into the pixel data of said window, so that pixel data to be converted by said converting means is modified by the corrected error data.

2. An apparatus according to claim 1, wherein: said diffusing means includes means for compensating for the target pixel data to be converted by said converting means by the comparison result output from said comparing means.

3. An apparatus according to claim 1, wherein said extracting means includes means for storing the pixel data of the window, and said providing means includes means for generating the value of the feature data on the basis of a difference between a maximum value and a minimum value of the pixel data in said storing means.

4. An apparatus according to claim 1, wherein said generating means includes:

means for detecting local maximum values and local minimum values of a plurality of pixels adjacent to one pixel in the window;

means for detecting an extreme maximum value of the detected local maximum values of the pixels, and an extreme minimum value of the detected local minimum values of the pixels; and means for calculating the value of the feature data on the basis of a difference between the extreme maximum value and the extreme minimum value.

5. An apparatus according to claim 1, further comprising:

means for delaying the supply of pixel data from said storing means by a predetermined delay time to provide delayed pixel data, said predetermined delay time corresponding to a time required to generate the value of the feature data; and means for mixing the delayed pixel data with data diffused by said diffusing means and corresponding to the corrected error data, so as to provide the target pixel data to be converted by said converting means.

6. An apparatus according to claim 1, wherein said compensating means includes:

means for weighting the comparison result from said comparing means with a predetermined weighting coefficient to provide data for modifying the pixel data to be converted by said converting means.

7. An apparatus according to claim 2, wherein said correcting means includes means for performing a calculation:

$$CE = EB/\Delta Dmax$$

where CE denotes the comparison result, EB denotes the error data, and $\Delta Dmax$ denotes the value of the feature data.

8. An image processing apparatus comprising:

means for quantizing image data of a pixel of interest in an image to be processed;

means for calculating a quantization error on the basis of the data quantized by said quantizing means and the image data;

means for extracting a feature amount representing a feature of the image from the image data within a predetermined range including the pixel of interest;

means for calculating an error correction amount for correcting the quantization error from said quantization error calculating means in accordance with the feature amount extracted by said feature amount extracting means;

means for prestoring a weighing coefficient used to calculate a weighted error;

means for calculating the weighted error by multiplying the error correction amount from said error correction amount calculating means with the weighting coefficient stored in said prestoring means, so that the weighted error obtained from the error correction amount is distributed into peripheral pixels of the pixel of interest;

means for storing the weighted error calculated by said weighted error calculating means, to be distributed into the peripheral pixel; and means for correcting the image data of the pixel of interest in accordance with the weighted error stored in said storing means; said correcting means including means for comparing the feature data with a predetermined reference value so as to output a comparison result representing the error data when the value of the feature data is smaller than the reference value, and to output another comparison result having a predetermined value when the value of the feature data is larger than the reference value.

9. An image processing method for processing image information having a plurality of pixel data, comprising the steps of:

extracting a window, containing target pixel data and peripheral pixel data of the target pixel data, from the image information;

providing feature data having a value corresponding to a contrast with respect to pixel data of the window;

digitizing the target pixel data to provide digitized pixel data;

detecting error data representing a difference between the target pixel data and the digitized pixel data;

correcting the error data on the basis of the feature data, to provide corrected error data;

comparing the feature data with a predetermined reference value so as to output a comparison result representing the error data when the value of the feature data is smaller than the reference value, and to output another comparison result having a predetermined value when the value of the feature data is larger than the reference value; and diffusing the corrected error data into the pixel data of said window, so that the pixel data to be digitized is modified by the corrected error data.

10. An image processing method comprising the steps of:

digitizing image data to provide digitized image data, said image data corresponding to an input image having a target pixel and its peripheral pixels;

calculating a digitization error from a difference between the digitized image data and the image data;

extracting feature data from the input image, said feature data representing a contrast of the input image;

correcting the digitization error by the feature data to provide a corrected digitization error;

weighting the corrected digitization error by a given weighting coefficient to provide a weighted digitization error;

diffusing the weighted digitization error into data of the peripheral pixels, to provide diffused digitization error; and correcting the input image having the target pixel according to the diffused digitization error; and comparing the feature data with a predetermined reference, value so as to output a comparison result representing the error data when the value of the feature data is smaller than the reference value, and to output another comparison result with a predetermined value when the value of the feature data is larger than the reference value.

11. An image processing apparatus for processing image information having a plurality of pixel data of n bits which represent a contrast of the pixel data, where n denotes a natural number of more than two, said image processing apparatus comprising:

extracting means for sequentially extracting from the image information a window containing target pixel data and peripheral pixel data of the target pixel data;

means for providing feature data having a value corresponding to a contrast with respect to pixel data of the window extracted by said extracting means;

means for converting the target pixel data into pixel data of m bits, to provide converted pixel data, where m denotes a natural number less than n;

means for detecting error data representing a difference between the target pixel data and the converted pixel data;

means for correcting the error data on the basis of the feature data to provide corrected error data, including means for comparing the feature data with a predetermined reference value so as to output the error data detected by the detecting means as the corrected error data when the value of the feature data is smaller than the reference value, and means for changing the error data detected by the detecting means into zero data, so as to output the zero data as the corrected data when the value of the feature data is larger than said reference value, and;

means for diffusing the corrected error data into the pixel data of said window, so that pixel data to be converted by said converting means is modified by the corrected error data.

* * * * *